United States Patent

Matsue

[15] 3,703,709

[45] Nov. 21, 1972

[54] HIGH SPEED ASSOCIATIVE MEMORY CIRCUITS

[72] Inventor: Shigeki Matsue, Tokyo, Japan

[73] Assignee: Nippon Electric Company, Ltd., Tokyo, Japan

[22] Filed: May 21, 1970

[21] Appl. No.: 39,291

[30] Foreign Application Priority Data

May 24, 1969 Japan ....................44/40505
Jan. 28, 1970 Japan ....................45/7435

[52] U.S. Cl.........340/173 FF, 307/238, 340/173 AM
[51] Int. Cl...........................................G11b 13/00
[58] Field of Search .....................340/173; 307/238

[56] References Cited

UNITED STATES PATENTS

| | | | |
|---|---|---|---|
| 3,551,899 | 12/1970 | Igarashi | 340/173 |
| 3,548,386 | 12/1970 | Bidwell et al. | 340/173 |
| 3,390,382 | 6/1968 | Igarashi | 340/173 |
| 3,354,440 | 11/1967 | Farber et al. | 340/173 |

OTHER PUBLICATIONS

D. C. Davies et al., "An Integrated Charge-Control J–Flip-Flop" 1964 International Solid-State Circuits Conference.

B. A. Augusta & R. W. Fletcher, IBM Technical Disclosure Bulletin Vol. 8, No. 12, May 1966, pg. 1851–1852.

*Primary Examiner*—Maynard R. Wilbur
*Assistant Examiner*—Charles D. Miller
*Attorney*—Sandoe, Hopgood and Calimafde

[57] ABSTRACT

A high-speed associative memory circuit is disclosed comprising a flip-flop operating as a memory storage circuit, and a pair of switching transistors connected to the "true" and "not" output terminals of the flip-flop. The latter transistor pair thus defines a circuit for detecting the state of the flip-flop transistors.

4 Claims, 6 Drawing Figures

*INVENTOR*
SHIGEKI MATSUE

*by*

Sandoe, Hopgood & Calimafde
ATTORNEYS

INVENTOR
SHIGEKI MATSUE
by
Sandoe, Hopgood & Calimafde
ATTORNEYS

HIGH SPEED ASSOCIATIVE MEMORY CIRCUITS

This invention relates to associative memory circuits for high-speed memory devices adapted for use in digital computers and the like and more particularly to an associative memory circuit of the kind specifically adapted for fabrication by integrated circuitry utilizing bipolar transistors.

Intrinsically high speed operation as compared with the MOS memory circuit is required in high-speed memory systems. As is known, the speed of a memory circuit is substantially governed, of two alternatives — readout and write-in operations—by the speed of readout operation. With conventional bipolar memory circuits in which powers for memory storage circuits are appropriated for readout operations, there has been a contradictory tendency that the effort of decreasing the power consumption brings about a decrease in the operating speed, whereas increasing the speed results in an increase in power consumption. For this reason the advent of high-speed and low-power associative memory circuits has been sought.

It is thus an object of this invention to meet the above-mentioned requirements by providing a new and improved associative memory circuit capable of high speed operation at comparatively low power consumption.

The associative memory circuit according to the principles of this invention is composed essentially of a flip-flop circuit containing a first pair of cross-connected transistor elements, which can take either of two stable states, and which operates as a memory storage circuit, and a second pair of bipolar switching transistors with their bases connected, respectively, in the "true" and "not" output terminals of the flip-flop circuit. The bipolar switching transistors constitute a circuit for detecting the state of the flip-flop circuit. The emitters of the pair of switching transistors are connected respectively to one end of two resistors and the other end of these resistors are connected to information terminals for receiving a binary signal "0" and "1." The collectors of the switching transistors are connected in common to a word select terminal for receiving word select signals. It will be seen with this circuit that upon applying information signals to the information terminals for "0" and "1" binary signals with a bias applied in the word select terminal, so that both switching transistors may be operated at a high current gain, no current flows through the word select terminal, provided that the flip-flop state is coincident with the information applied to the information terminals, whereas either of the two switching transistors is turned "on" and current flows through the word select terminal in case the flip-flop state is non-coincident with the information applied to the information terminals. In the write-in period, a bias on the word select terminal is caused to vary in a state under which the flip-flop state and the information applied to the information terminals are non-coincident, such that the current gain of either transistor that has been turned "on" is decreased. The base current of the transistor that has been turned on is thereby increased and the state of the flip-flop is reversed. A write-in into the flip-flop can thus take place by utilizing variations in current gain due to the collector bias change of each transistor, while the two switching transistors with their bases connected to the flip-flop circuit normally operate at a sufficiently high current gain. An associative memory circuit capable of high-speed operation at a low power consumption and having a comparatively simple circuit structure can thus be realized.

Another feature of this invention is, the addition of a clamping circuit across the base and collector of each of the two switching transistors, which constitute the circuit for detecting either stable state of the memory storage circuit. The collector bias voltage for either of these transistors is caused to vary in write-in periods, thereby causing the clamping current for the prevention of saturation of the transistor to increase through the corresponding clamping circuit. Thus, a write-in operation takes place by the use of a driving current fed from the word select circuit system.

The principles and features of the present invention will be understood more in detail from a consideration of the following detailed description of several embodiments of this invention taken in conjunction with the accompanying drawings, in which:

FIG. 1 is a schematic circuit diagram illustrating a basic associative memory circuit structure embodying this invention;

FIGS. 2*a* and 2*b* are schematic circuit diagrams illustrating modifications of the associative memory circuit shown in FIG. 1;

Figure 1:
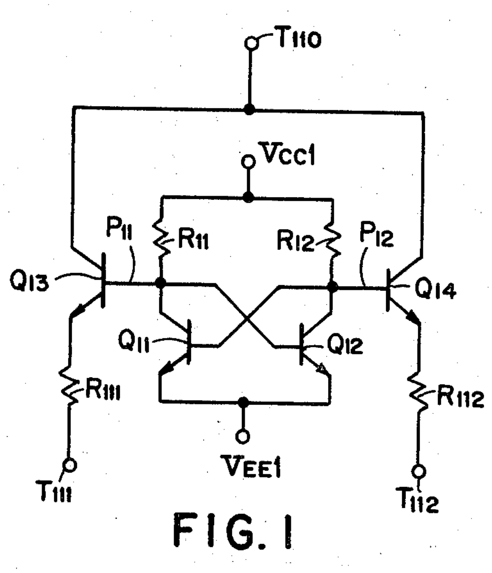

Referring to FIG. 1, the basic associative memory circuit of this invention comprises a saturation-type flip-flop circuit composed of a pair of cross-connected transistors Q11 and Q12 and resistors R11 and R12 and a pair of bipolar switching transistors Q13 and Q14 having bases respectively connected to the "true" and "not" output terminals of the flip-flop circuit. The emitters of transistors Q13 and Q14 are respectively connected through impedances R111 and R112 to a pair of information signal terminals T111 and T112, and the collectors of transistors Q13 and Q14 are connected in common to a word select terminal T110.

Suppose that transistor Q11 is turned "on" and transistor Q12 is turned "off". The potentials at the bases of transistors Q14 and Q13 are then respectively expressed as VEE1 + VBE (SAT) and

VEE1 + VCE (SAT)

Ordinarily, VCE (SAT)

approximates 0 volt, provided that the collector current is small. Therefore, the potential at the base of transistor Q14 becomes higher than that at the base of transistor Q13 by about 0.6 to 0.8 volt.

If the potential on terminal T111 is higher than VEE1 by V1 volts and that on terminal T112 is lower than VEE1 by V2 volts, with the potential of the word select terminal T110 made higher than the collector source voltage VCC1 of the flip-flop, the potential difference between the base of transistor Q13 and terminal T111 becomes $$\{VEE1+VCE(SAT)\}-\{VEE1+V1\}$$
$$=VCE(SAT)+(V1$$

and transistor Q13 is turned "off," while the potential difference between the base of transistor Q14 and terminal T112 becomes $$\{VEE1+VBE(SAT)\}-(VEE1-V2))$$
$$=VBE(SAT)+V2$$

and transistor Q14 is turned "on".

If transistor Q11 is "off", and transistor Q12 is "on," the potential difference between the base of transistor Q13 and terminal T111 is expressed as $$\{VEE1+VBE(SAT)\}-\{VEE1+V1\}$$
$$=VBE(SAT)-V1$$

and the potential difference between the base of transistor Q14 and terminal T112 is expressed as $$\{VEE1+VCE(SAT)\}-\{VEE1-V2\}$$
$$=VCE(SAT)+V2$$

If in this case V1 and V2 are so chosen as to meet the conditions $$VBE(SAT)-V1<VBE(ON)$$

$VCE(SAT)+V2<VBE(ON)$, both transistors Q13 and Q14 are turned "off."

Assume that V1 and V2 are chosen so as to meet the above-mentioned conditions and that terminals T111 and T112 are respectively maintained at a high and a low potential. Then, provided transistor Q11 of the flip-flop is "on" and transistor Q12 is "off," transistor Q13 is "off" and transistor Q14 is "on," with the result that current flows through the word select terminal T110. On the contrary, transistor Q12 is "on" and transistor Q11 is "off," both transistors Q13 and Q14 are turned "off," with the result that no current flows through terminal T110.

The situation will be just opposite to the above, when terminals T111 and T112 are maintained at a low and a high potential, respectively — that is, current flows through terminal T110 when transistor Q11 is "off" and transistor Q12 is "on."

In other words, by maintaining either of information terminals T111 and T112 high and the other low, the relationships between the state of the flip-flop composed of transistors Q11 and Q12 and the state of terminals T111 and T112 can be distinguished by whether or not current flows through the word select terminal T110. This is to detect coincidence or non-coincidence between the internal state of the flip-flop and the external information, which is nothing but the associative readout operation possessed by the associative memory circuit.

Now let the values of impedances R111 and R112 be each RE and the current-amplification factor under normal operation of both transistors Q13 and Q14 be denoted by $\beta$.

If transistor Q14 is turned "on" with transistor Q11 turned "on," transistor Q13 turned "off," terminals T111 and T112 made high and low, and word select terminal T110 maintained at a sufficiently high potential, the emitter current of transistor Q14 is expressed as $$\frac{V_{BE}(SAT)+V_2-V_{BE}(ON)}{R_E}$$

the base current becomes a fraction of the emitter current expressed as $1/\beta+1$, and the internal level drop in the flip-flop due the base current of transistor Q14 (assuming that the value of both impedances R11 and R12 is denoted by $R_C$) becomes $$\frac{R_C}{R_E}\,\frac{V_{BE}(SAT)+V_2-V_{BE}(ON)}{\beta+1}$$

which may be ignored for sufficiently large values of the current-amplification factor $\beta$.

If the potential at terminal T110 is lowered with terminals T111 and T112 maintained high and low, respectively, transistor Q14 approaches saturation, the base current of transistor Q14 increases, and the potential on terminal P12 decreases. If the potential on terminal P12 becomes less than $V_{EE1}+V_{BE}(ON)$, transistor Q11 is turned "off," potential on terminal P11 becomes higher, and transistor Q12 is turned "on." As soon as transistor Q12 is turned "on," the potential difference between terminals P12 and T112 becomes $V_{CE(SAT)}+V_2$, transistor Q14 is turned "off" as mentioned previously, and transistor Q13 is also turned "off," since terminal T111 is high, with the result that the flip-flop is no longer affected by the external information signal, and retains its present state. In this manner, either desired stable state can be set into the flip-flop.

Care must be exercised for the circuit of FIG. 1 so as not to lower the potential on terminal T110 by a marked extent in lowering the potential for the purpose of setting either desired stable state into the flip-flop; otherwise both transistors Q13 and Q14 will be turned "off" even if the voltage at terminals T111 or T112 is high, and a current will flow from the base to the collector due to a forward bias of the base-collector potential of transistor Q13 or Q14, whereby the flip-flop composed of transistors Q11 and Q12 may take the other undesirable state. This drawback is eliminated by the circuit of FIG. 2.

Figure 2A:
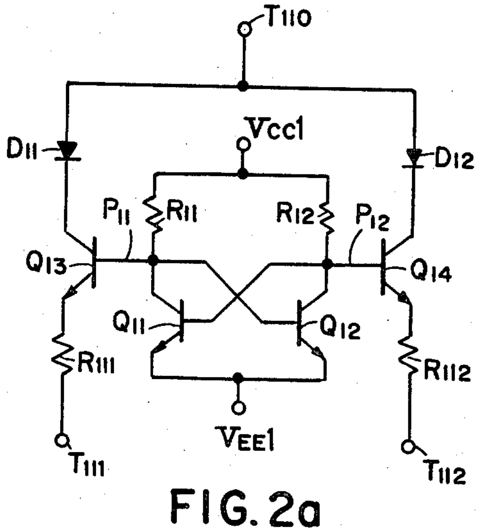

Referring the FIG. 2*a* which shows a first modification of the basic associative memory circuit of FIG. 1, it will be seen that diodes D11 and D12 are connected respectively to the collectors of transistors Q13 and Q14 in such a sense that collector currents flow therethrough with transistors Q13 and Q14 turned "on" while the opposite ends of the diodes are connected in common to terminal T110. The associative readout operation of this circuit with terminal T110 maintained sufficiently high is substantially the same as that for the circuit of FIG. 1. By connecting these diodes to the collectors, it is intended that no current be conducted from the base to the collector of either transistor due to a forward bias of the base-collector potential when either stable state is set into the flip-flop with the potential at terminal T110 maintained low.

Figure 2B:
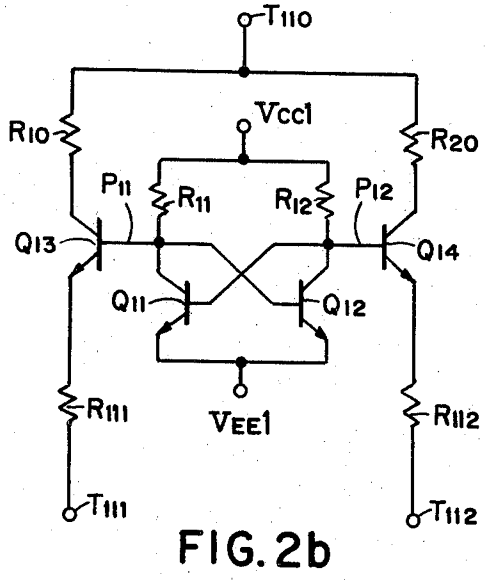

Referring to FIG. 2*b*, which illustrates a second modification of the circuit of FIG. 1, it is seen that one ends of resistors R10 and R20 are connected respectively to the collectors of transistors Q13 and Q14 and the other ends of these resistors are connected in common to terminal T110.

These resistors may represent an increase in the collector resistances of transistors Q13 and Q14, or they may represent actual externally connected resistances. The associative readout operation of this circuit with terminal T110 maintained sufficiently high is substantially the same as that for the circuit of FIG. 1. In setting either state into the flip-flop with this circuit, it is necessary that the potential at terminal T110 be lowered to such an extent that the base-collector potential of each of transistors Q13 and Q14 may not become too deep a forward bias when no current flows in resistors R10 or R20. If transistor Q11 is turned "on" and terminals T111 and T112 are respectively high and low in this case, transistor Q14 is turned "on" and collector current flows. As soon as the collector current flows, collector potential of transistors Q14 decreases by the presence of transistor R20, the base-collector forward bias increases, and the base current increases as well. As a consequence, a portion of the current flowing in the emitter of transistor Q14 causes the collector potential to be lowered and the remaining portion flows as the base current, causing the potential on terminal P12 to be lowered and the state of the flip-flop to be reversed. Upon the reversal of the state of the flip-flop- that is, transistor Q11 turning "off" and Q12 turning "on", both transistors Q13 and Q14 are turned "off" and no collector current is conducted. Thus the effect of the resistors R10 and R20 disappears and thereafter neither transistor Q13 nor transistor Q14 becomes conducting.

Figure 3:
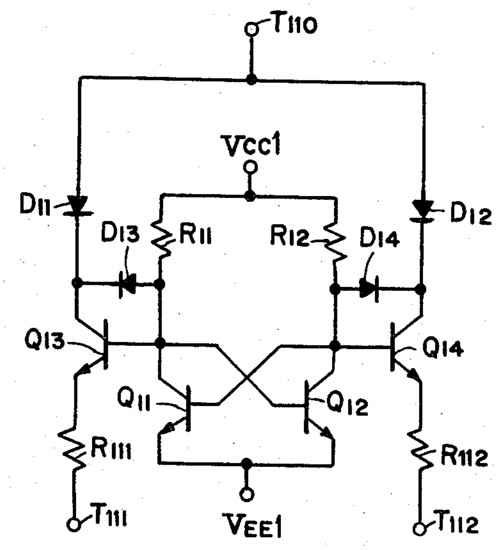
FIG. 3 is a schematic circuit diagram illustrating an example of a particular associative memory circuit of this invention provided with a pair of clamping circuits.

An associative memory circuit provided with a pair of clamping circuits according to another embodiment of this invention is illustrated in FIG. 3. This circuit is the same as that shown in FIG. 2*a*, with the difference that two clamping circuits here shown as consisting of diodes D13 and D14 are respectively connected across the base and the collector of both transistors Q13 and Q14. The associative readout operation of this circuit takes place in the same manner as the circuit of FIG. 1. The write-in operation with this circuit takes place as follows: As the potential on the word select terminal T110 is lowered with transistor Q11 turned "on," terminal T111 maintained high and terminal T112 is maintained low, the collector potential of transistor Q14 decreases and the clamping circuit diode D14 starts to operate. As the clamping circuit diode D14 becomes "on," current is conducted from $V_{CC1}$ via impedance R12, causing the base potential of transistor Q11 to be lowered and transistor Q11 to be turned "off." This causes the base potential of transistor Q12 is be increased and transistor Q12 to be turned "on."

The clamping circuit diodes D13, and D14 may, for example, be a germanium diode when transistors Q13 and Q14 are made of silicon, or diode D13 and D14 may be a Schottky-barrier diode, no matter which of silicon or germanium the transistors Q13 and Q14 are made of. The magnitude of the threshold voltage in the forward direction is somewhat different with the type of junction materials used for the Schottky-barrier diode, the voltage being approximately 0.4 volt and 0.3 volt for the silicon-molybdenum junction and the silicon-aluminum junction, respectively. The clamping circuit has the clamping action as a result of the conduction of current from the base to the collector without causing the transistor (e.g. transistor Q14) to saturate. The clamping circuit is by no means restricted to the use of diodes; the clamping action due to the use of a PNP transistor, for example, makes no difference in increasing the base current of transistors Q13 and Q14 and in suppressing saturation.

When PNP transistors (hereinafter referred to as "-clamping transistors") are used in place of the diodes D13 and D14, emitters thereof are connected respectively to the bases of Q13 and Q14, their bases are connected to the collectors of transistors Q13 and Q14, and their collectors are connected to a common power source which is separately provided from that of the flip-flop. In this case, when terminal T110 is high, both clamping transistors remain unoperated, because the base-emitter potential of each clamping transistor becomes either a reverse bias or a forward bias insufficient to turn "on" the transistor.

Assume now that transistor Q11 in the flip-flop is turned "on," the potential at terminal T111 is high and that at terminal T112 is low. When the potential at terminal T110 is lowered under this condition, the collector potential of transistor Q14 decreases, while as the forward bias of the base-collector potential of transistor Q14 becomes deeper, the forward bias of the base-emitter voltage of the clamping transistor replacing diode D14, also becomes deeper, with the result that this clamping transistor is turned "on." Current is then conducted from power source $V_{CC1}$ via resistor R12 to the other power source connected to the collector of this clamping transistor, causing the potential on the emitter of this clamping transistor, that is, the potential at the base of transistor Q11 to be lowered. Thus transistor Q11 is turned "off" and transistor Q12 is turned "on." In such way, a write-in takes place. Readout takes place in the same manner as mentioned previously.

Figure 4:
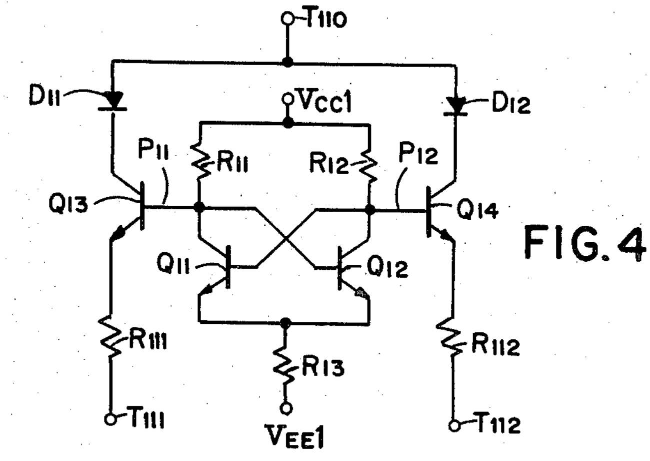
FIG. 4 is a schematic circuit diagram illustrating a further modification of the associative memory circuit shown in FIG. 1 or FIG. 2*a;*

All of the flip-flop circuits in FIGS. 1 through 3 are of the saturation type, but a flip-flop of the non-saturation type as shown in FIG. 4 may may be employed for an associative memory circuit of this invention.

Referring to the flip-flop of FIG. 4, assume that transistor Q11 is turned "on" and transistor Q12 is turned "off." The base potential of transistor Q11 is then approximately equal to $V_{CC}$ and the emitter potential of transistor Q11 becomes $V_{CC} - V_{BE(ON)}$, provided the current gain $h_{FE}$ of transistor Q11 is sufficiently high, wherein $V_{BE(ON)}$ denotes the base-emitter voltage when transistor Q11 is conducting, which is ordinarily about 0.7 volt.

The current flowing in transistor Q11 is given by $$\frac{V_{CC}-V_{BE(ON)}-V_{EE}}{R_E'}$$

where $R_E$, is the value of impedance R13. Therefore the collector potential of transistor Q11 is given by $$V_{CC}-\frac{R_C}{R_E'}(V_{CC}-V_{BE(ON)}-V_{EE})$$

where $R_C$ denotes the impedance of both resistors R11 and R12. The base-collector forward drop e of transistor Q11 in this case becomes $$e=\frac{R_C}{R_E'}(V_{CC}-V_{BE(ON)}-V_{EE}) \quad (1)$$

Accordingly, provided the actual base-collector forward drop given by the equation (1) is designed less than the base-collector forward threshold voltage $V_{BC}$ (ordinarily about 0.6 volt) which causes transistor Q11 to be unsaturated, transistor Q11 remains unsaturated, with the result that the flip-flop performs unsaturated operation. In order to realize this condition, the values of $V_{CC} - V_{EE}$ (which is normally selected in the range 1.6 to 5.0 volts) and $R_C/R_E'$ need to be selected so as to make the value of equation (1) less than $V_{BC}$. A numerical example is given below. Assuming that $V_{BE(ON)} = 0.7V$ and $V_{BC} = 0.6V$, $R_C/R_E'$ must be selected at two-thirds and about 0.14 respectively in case $V_{CC} - V_{EE}$ are 1.6 and 5 volts.

Incidentally, the potential difference between the collectors of transistors Q11 and Q12 — that is, across the terminals P11 and P12 under steady conditions, can be expressed as $$\frac{R_C}{R_E'}(V_{CC}-V_{BE(ON)}-V_{EE})$$

which is the same as equation (1).

Furthermore, a pair of clamping circuits may be provided for the saturation type flip-flop in order to convert it into a non-saturation type flip-flop. For this purpose, (1) a Schottky diode may be connected between the base and collector of each of the transistors Q11 and Q12 of the flip-flop in the direction from base to collector, or (2) a PNP transistor may be connected to each of transistors Q11 and Q12 in a manner such that the emitter, base and collector of the PNP transistor is connected to the base, collector of transistor Q11 or Q12 and another power source.

It must be noted here that the potential difference between terminals P11 and P12 of a non-saturation type flip-flop becomes smaller than that for a saturation type and that since $V_{BE(ON)}$ and $V_{CE(ON)}$ must be used instead of $V_{BE(SAT)}$ and $V_{CE(SAT)}$ as design parameters, more severe accuracy is called for the state setting voltages V1 and V2 to be applied to the information terminals.

Figure 5:
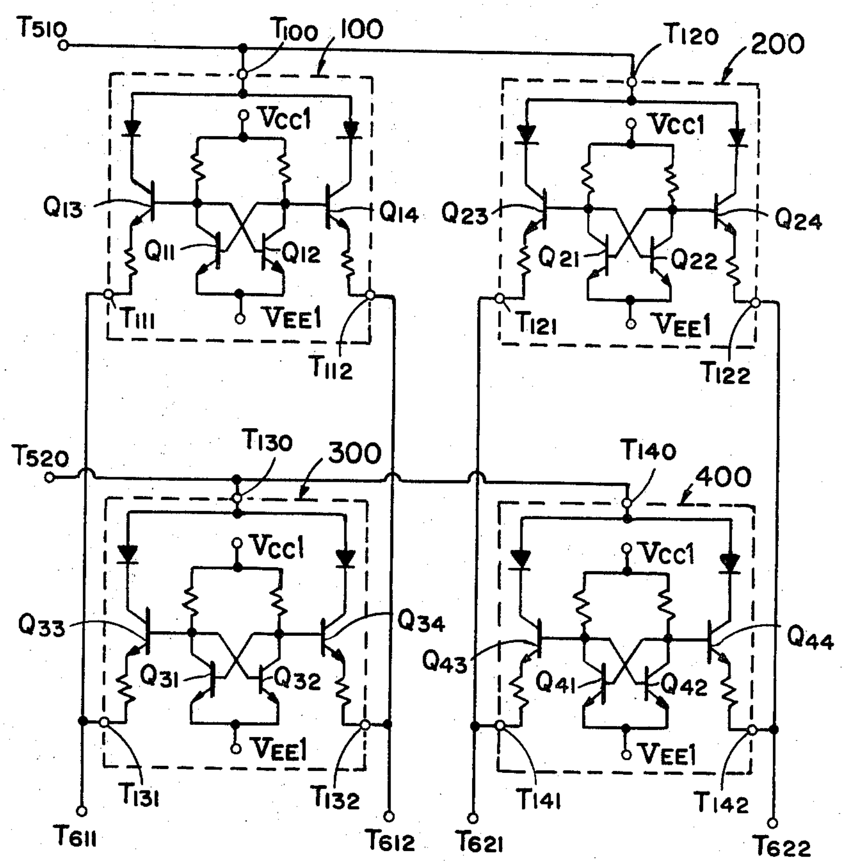
FIG. 5 is a schematic circuit diagram illustrating an example of an associative memory system composed of basic memory circuits of this invention.

FIG. 5 illustrates an associative memory system composed of four memory cells, 100, 200, 300, and 400, arranged in a matrix of two words and two bits.

In FIG. 5, T510 and T520 denote respectively first and second word select terminals, T611 and T612 denote a pair of first bit signal terminals for "0" and "1," binary signals, and T621 and T622 denote a pair of second bit signal terminals for "0" and "1."

If first and second word terminals T510 and T520 are made low and high respectively with the first bit terminals T611 and T612 respectively made low and high and, the second bit terminals T621 and T622 respectively made low and high, transistor Q11 in flip-flop of the memory cell 100 is turned "on" and transistor Q12 is turned off, while transistor Q21 in the flip-flop of the memory cell 200 is turned "on" and transistor Q22 is turned "off."

If on the other hand terminals T611 and T612 are made low and high and terminals T621 and T622 are made high and low with word select terminals T510 and T520 made high and low respectively, transistor Q31 in memory cell 300 is turned "on" and transistor Q32 is turned "off," while transistor Q41 in memory cell 400 is turned "off" and Q41 is turned "on."

In this case, an information signal for reversing the state of the flip-flop of memory cell 200 is applied to terminals T121 and T122, but the flip-flop in memory cell 200 is unaffected thereby, holding its previous set condition, because a high potential is applied to the first word select terminal T510.

If both terminals T510 and T20 are made high, terminal T611 low, terminal T612 high, terminal T621 low, and terminal T622 high with each of the four memory cells for two words and 2 bits being in its properly set state, transistor Q13 in memory cell 100 is turned "off" because the base of transistor Q13 is low and terminal T110 is low, while transistor Q14 in the same memory cell is turned "off," because the base of transistor Q14 is high and terminal T112 is high, with the result that no current flows through terminal T110; transistor Q23 in memory cell 200 is turned "off," because the base of transistor Q23 is low and terminal T121 is low, while transistor Q24 in the same memory cell is turned "off," because the base of transistor Q24 is high and terminal T122 is high, with the result that no current flows through terminal T120; transistor Q33 in memory cell 300 is turned "off," because the base of transistor Q33 is low and T121 is low while transistor Q34 in the same memory cell is turned "off," because the base of transistor Q34 is high and T132 is high, with the result that no current flows through terminal T130; and transistor Q43 in memory cell 400 is turned "on," because the base of transistor Q43 is high and terminal T141 is low, while transistor Q44 in the same memory cell is turned "off," because the base of transistor Q44 is low and terminal T142 is high, with the result that current conducting in transistor Q43 flows through terminal T140.

Accordingly, no current flows through the terminal T510, whereas current flows through the terminal T520 via terminal T140.

In other words, provided that the internal state and the information applied to the bit signal terminals are coincident for the flip-flops of all memory cells connected to one word select terminal, no current flows through the terminal, whereas current flows therethrough in the presence of non-coincidence even for at least one flip-flop.

The foregoing description signifies that coincidence or non-coincidence must be detected in word units for all memory cells connected to each word select line in order to perform the associative readout.

A description has been made above in connection with a particular associative memory system composed of a matrix of two words and two bits illustrated in FIG. 5. This description could readily be generalized to an associative memory system having *m* words and *n* bits with similar operations as mentioned previously. It will also be obvious to one skilled in the art that similar operations can be expected, even if the circuit of FIG. **2*a* used in each of the memory cells is replaced with any one of the circuits shown in FIG. 1, 2*b*, 3, 4**, or a modification of such circuit.

The foregoing description is concerned only with a particular case in which an associative readout is performed for all of *n* bits with a system of *m* words and *n* bits, but, in general cases, the readout would be registered for *p* bits only out of *n* bits. In such case, there must be a contrivance such that currents due to the non-coincidence will never flow through the word select terminals for the remaining (*n–p*) bits.

The manner of this contrivance will be explained concretely by reference to the basic association memory circuit of FIG. 1.

As has been mentioned, coincidence or non-coincidence in the associative readout can be detected by whether or not current flows through terminal T110, provided that terminal T110 is made high, and either of terminals T111 and T112 is made high and the other low in the circuit of FIG. 1. If both terminals T111 and T112 are made high, transistors Q13 and Q14 are both turned "off" irrespective of the state of the flop-flop composed of transistors Q11 and Q12, resulting in no current flowing through terminal T110. In other words, it becomes possible with the circuit of FIG. 1 to set either stable state in the flip-flop and perform the associative readout by making either terminal T111 or T112 high and the other low, and to stop the operation of this memory cell by making both terminals T111 and T112 high. In the latter case, the word select terminal will assume an output state as if coincidence had occurred in the associative readout.

In performing the associative readout for *p* bits out of the *n* bits, correct coincidence potentials can be derived from the word select terminals by applying such information signal voltages for the remaining $(n-p)$ bits. In such a case, $(n-p)$ bits are sometimes said to have been "masked."

Figure 6:
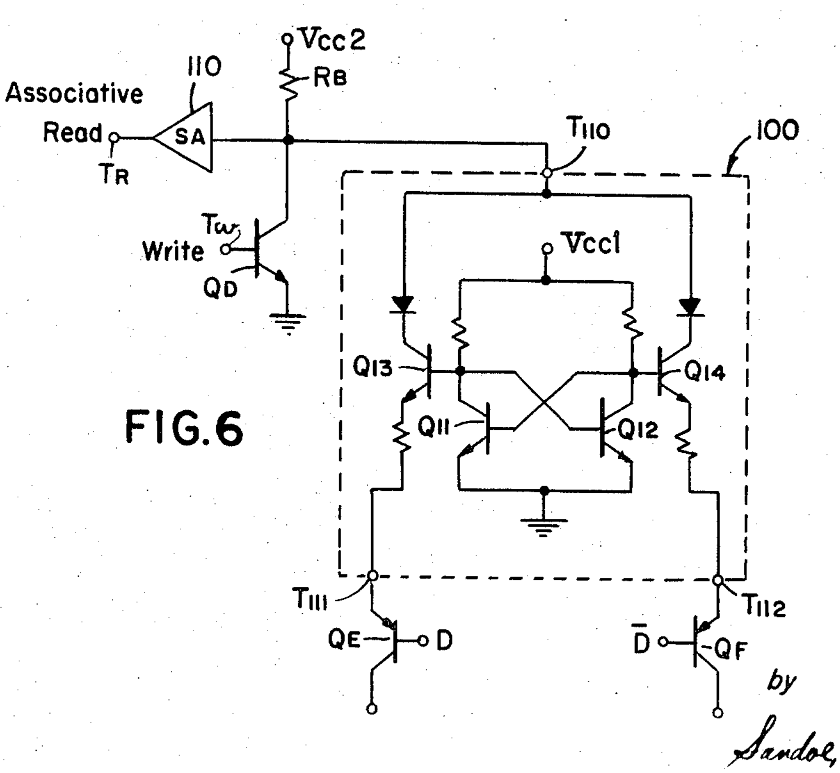
FIG. 6 is a schematic circuit diagram illustrating an example of peripheral circuitry for use with an associative memory circuit embodying this invention.

FIG. 6 illustrates a driving circuit and an associative readout circuit as an example of peripheral circuitry to be annexed to an associative memory circuit according to this invention. Although the circuit of FIG. 2 is used as the associative memory circuit in this figure, any other circuit that has been described herein may be used therefor.

As illustrated, the word select terminal T110 of the memory cell 100 is connected to a second power supply source $V_{CC2}$ and also to the collector of a write-in transistor QD. The base of this transistor is connected to a write-in input terminal Tw. Terminal T110 is also connected to an associative readout output terminal $T_R$ via a sense amplifier 110. Information terminals T111 and T112 of this memory cell are respectively connected to the emitters of transistors $Q_E$ and $Q_F$. The bases of these transistors serve as information terminals D and $\overline{D}$.

For ease of description, it is assumed here that the voltage of power supply source $V_{CC1}$ and power supply source $V_{CC2}$ are both +2 volts and that external information is applied to information terminals D and $\overline{D}$ with the write-in transistor $Q_D$ turned "off". At the bases of readout transistors Q13 and Q14 in memory cell 100, potentials of about +0.8 volt and 0 volt, or vice versa, appear depending on the flip-flop state. If the level potentials of terminals D and $\overline{D}$ are made about −0.6 volt and −1.4 volts or vice versa, current flows through terminal T110 when the flip-flop in the memory cell 100 and the information terminals D and $\overline{D}$ are non-coincident in phase so as to turn "on" both transistors Q13 and $Q_E$, or transistors Q14 and $Q_F$. Thus an associative readout is carried out by detecting at terminal $T_R$ whether or not current flows via resistance $R_B$.

In writing, transistor $Q_D$ is turned "on" with an information signal applied to terminals D and $\overline{D}$. This causes the potential of terminal T110 to be lowered and current to be fed from transistor $Q_E$ or $Q_F$ to be conducted in the flip-flop in memory cell 100, whereby either stable state is set into the flip-flop.

While terms "turned on" and "turned off" have been freely used for transistor operations, they are simply for discriminating larger currents from smaller currents, but not for signifying such definite operations as in relay contact operations. It has be assumed further in the foregoing description that all transistor elements used in the various associative memory circuits except the clamping circuits are of the NPN type, but transistor elements of the PNP type may be used, provided the power source polarity the diode polarity and the like are respectively reversed.

While there have been described and shown some novel features of this invention as applied to some embodiments and their modifications, it will be understood that they are susceptible to variation without departing from the spirit and scope of this invention.

What is claimed is:

1. An associative memory circuit comprising a flip-flop circuit containing a pair of cross-connected transistors, first and second bipolar switching transistors each having a base, an emitter, and a collector terminal, said base terminals being connected respectively to the "true" and "not" terminals of said flip-flop circuit, means comprising first and second impedance elements and first and second data signal terminals for applying data signals to said emitter electrodes of said first and second switching transistors through said first and second impedance elements, respectively, means comprising a word select terminal for applying a word select signal to both of said collector terminals of said first and second switching transistors, and clamping means comprising first and second diode means respectively coupled between the collectors and bases of said first and second switching transistors for preventing saturation of the associated one of said first and second switching transistors.

2. The memory circuit of claim 1, in which said first and second diode means comprise Schottky barrier diodes.

3. An associative memory circuit comprising a flip-flop circuit including a pair of cross-connected transistors, first and second bipolar switching transistors each having a base, and emitter, and a collector terminal, said base terminals being connected respectively to the "true" or "not" terminals of said flip flop circuit, means for applying data signals to said emitters of said first and second switching transistors, means for applying a word select signal to said collectors of said first and second switching transistors, said word select signal applying means comprising a word select terminal coupled in common to said collectors and first and second impedance elements, said data signal applying means comprising first and second data signal terminals respectively coupled to said emitters through said first and second impedance elements, third and fourth transistors respectively coupled to said data signal terminals, a fifth transistor coupled to said word select terminal, and means for applying a complementary data signal to said third and fourth transistors and for applying a write command signal to said word select terminal during a data write-in operation.

4. The combination of claim 3, further comprising an output terminal, and amplifier means interposed between said select terminal and said output terminal and coupled to said fifth transistor.

* * * * *